US010855603B2

(12) United States Patent
Esserman et al.

(10) Patent No.: US 10,855,603 B2
(45) Date of Patent: Dec. 1, 2020

(54) METHODS AND SYSTEMS FOR MULTI-LEVEL NETWORK CAPACITY ALLOCATION

(71) Applicant: VIASAT, INC., Carlsbad, CA (US)

(72) Inventors: James Esserman, La Jolla, CA (US); Kristi A Jaska, Encinitas, CA (US); Anil K Agarwal, North Potomac, MD (US)

(73) Assignee: VIASAT, INC., Carlsbad, CA (US)

( * ) Notice: Subject to any disclaimer, the term of this patent is extended or adjusted under 35 U.S.C. 154(b) by 85 days.

(21) Appl. No.: 16/104,707

(22) Filed: Aug. 17, 2018

(65) Prior Publication Data

US 2019/0075055 A1    Mar. 7, 2019

Related U.S. Application Data

(63) Continuation of application No. PCT/US2016/018733, filed on Feb. 19, 2016.

(51) Int. Cl.
*H04L 12/851* (2013.01)
*H04L 12/801* (2013.01)

(52) U.S. Cl.
CPC .......... *H04L 47/2408* (2013.01); *H04L 47/11* (2013.01); *H04L 47/24* (2013.01); *H04L 47/2441* (2013.01); *H04L 47/15* (2013.01)

(58) Field of Classification Search
CPC ..... H04L 47/2408; H04L 47/11; H04L 47/24; H04L 47/2441; H04L 47/15
See application file for complete search history.

(56) References Cited

U.S. PATENT DOCUMENTS

| 5,768,123 | A | 6/1998 | Maxemchuk | |
| 6,404,735 | B1* | 6/2002 | Beshai | H04L 47/15 370/230 |
| 6,404,738 | B1* | 6/2002 | Reininger | H04L 12/5602 370/236 |
| 6,594,268 | B1* | 7/2003 | Aukia | H04L 45/04 370/230 |

(Continued)

OTHER PUBLICATIONS

International Report on Patentability, PCT/US2016/018733, dated Aug. 30, 2018, in 7 pages.

*Primary Examiner* — Philip J Chea
*Assistant Examiner* — Robert B McAdams
(74) *Attorney, Agent, or Firm* — Chang & Hale LLP

(57) ABSTRACT

Methods and systems for allocation of network capacity are disclosed. In one aspect, a method includes, determining a transmission profile for each of a plurality of service flow types, each transmission profile defining at least three different network capacity allocation parameters for a set of at least three different ordered network capacity allocation cycles, for each of the at least three ordered network capacity allocation cycles: selecting, for each service flow type, the network capacity allocation parameters in each service flow types transmission profile associated with a current network capacity allocation cycle of the at least three ordered network capacity allocation cycles, determining amounts of data to transmit for each of the plurality of service flow types based, at least in part, on the selected network capacity allocation parameters for the current network capacity allocation cycle, and transmitting the determined amounts over a communication network.

29 Claims, 8 Drawing Sheets

(56) References Cited

U.S. PATENT DOCUMENTS

| | | | | |
|---|---|---|---|---|
| 8,898,295 | B2* | 11/2014 | Agiwal | H04L 43/0882 |
| | | | | 370/343 |
| 9,641,424 | B1* | 5/2017 | Swig | H04L 47/822 |
| 9,674,099 | B2* | 6/2017 | Talat | H04L 47/2441 |
| 9,823,864 | B2* | 11/2017 | Pawlowski | G06F 3/0644 |
| 2003/0152096 | A1* | 8/2003 | Chapman | H04L 47/803 |
| | | | | 370/412 |
| 2011/0065469 | A1 | 3/2011 | Grabowsky et al. | |
| 2014/0059227 | A1 | 2/2014 | Esserman et al. | |

\* cited by examiner

| Cycle | Allocation |
|---|---|
| 1 | 5 |
| 2 | 10 |
| 3 | 7 |
| 4 | 4 |

303a/303b, 305a/305b, 307a/307b, 309a/309b

302c

| Cycle | Allocation |
|---|---|
| 1 | 5 |
| 2 | 10 |
| 3 | 7 |
| 4 | 4 |

319a/319b, 321a/321b, 323a/323b, 325a/325b

302b

| Cycle | Allocation |
|---|---|
| 1 | 8 |
| 2 | 3 |
| 3 | 6 |
| 4 | 7 |

311a/311b, 313a/313b, 315a/315b, 317a/317b

302d

| Cycle | Allocation |
|---|---|
| 1 | 8 |
| 2 | 3 |
| 3 | 6 |
| 4 | 7 |

327a/327b, 329a/329b, 331a/331b, 333a/333b

METHODS AND SYSTEMS FOR MULTI-LEVEL NETWORK CAPACITY ALLOCATION

Embodiments relate to allocation of network capacity to a plurality of service flow types, and more particularly, to a multi-level allocation of the network capacity.

BACKGROUND

The need to transmit an amount of data that exceeds a network's capacity may require the data to be prioritized. Thus, some data may be transmitted within the available network capacity while other data may be buffered and/or otherwise delayed. Existing systems provide predefined limits on a subscriber's traffic. For example, attributes of a paid subscription plan may define what predefined limits are used when allocating network capacity. During periods of congestion, adaptive queue management may be used to discard packets until network load more closely matches a network's capacity.

However, these methods often result in a poor user experience. Therefore, improved methods of managing network congestion are required.

BRIEF SUMMARY

The systems, methods, and devices described herein each have several aspects, no single one of which is solely responsible for its desirable attributes. Without limiting the scope of the invention(s) as expressed by the claims which follow, some features will now be discussed briefly. After considering this discussion, and particularly after reading the section entitled "Detailed Description" one will understand how the disclosed examples provide advantages that include improved allocation of available network capacity across a plurality of service flows. In some aspects, the allocation of available network capacity may be performed in multiple cycles. For example, first, a minimum amount specific to each service flow type may be allocated to each service flow during a first allocation cycle. This ensures each service flow receives its minimum allocation during the allocation cycle. The minimum commitment to each service flow may vary across service flows. For example, high priority service flows may receive a larger minimum commitment than lower priority service flows.

After the minimum commitment to each service flow is satisfied, variable amounts of allocation may be provided to each service flow in multiple phases. During each progressive phase, a proportion allocated to each service flow may vary. For example, in a first progressive phase, a first service flow may receive a first amount of data and a second service flow may receive half the first amount of data. In a second progressive phase, the first service flow may receive a second amount of data, and the second service flow may receive a third of the second amount of data.

The disclosed methods and systems provide for network capacity allocations for service flow types that may preferentially slow down certain service flow types as congestion increases. For example, in some embodiments, video flows may be slowed before web-data flows. This policy is based on the realization that modern video streams use adaptive coding and can adapt the video quality to a wide range of data rates. As congestion increases, the policies can control the relative allocated data rates between different flows. e.g., web-data flows get 2x the rate of video flows, irrespective of the number of flows of each type.

The disclosed methods and systems provide for polices that provide a higher level of service to certain subscriber types and packages over other. These methods and systems also provide for policies that provide low level of service to certain subscriber types and packages during congestion, but high level of service when congestion abates.

In some aspects, meta-policies may automatically adapt policy parameters. For example, a subscriber traffic policy can be changed dynamically during congestion based on its recent usage—e.g., a high recent usage can be used to demote a subscriber's policy relative to others, thereby preferentially slowing down large file downloads. Similarly, long term usage can be used to demote a subscriber's policy, thereby improving experience for users that use the system within their usage limits.

In some implementations, separate queues are provided for each subscriber and for each subscriber traffic class. A single scheduler operates periodically (as opposed to continuously as may be done by traditional schedulers). The scheduler computes allocations across thousands of queues, each with its own set of traffic rate parameters (defining network capacity allocations within cycles of the scheduler) with the multi-level allocations of network capacity resulting in a multi-step allocation graph for each flow, an example of which is discussed below with respect to FIG. 1.

The disclosed methods and systems are very flexible and can be used to create additional novel allocation policies. For example, groups of subscribers can be formed, with aggregate allocations to each group controlled by a set of policies similar to individual subscriber policies. The disclosed methods and systems are scalable to handle traffic with large number of subscribers and high aggregate data rates.

One aspect disclosed is a method of allocating network capacity over a communication channel of a network. The method includes determining a transmission profile for each of a plurality of service flow types, each transmission profile defining at least three different network capacity allocation parameters for a set of at least three different ordered network capacity allocation cycles. The method includes iteratively performing, for each of the at least three ordered network capacity allocation cycles: selecting, for each service flow type, the network capacity allocation parameters in each service flow type's transmission profile associated with a current network capacity allocation cycle of the at least three ordered network capacity allocation cycles; determining amounts of data to transmit for each of the plurality of service flow types based, at least in part, on the selected network capacity allocation parameters for the current network capacity allocation cycle; and transmitting over the communication channel, the determined amounts for each of the plurality of service flow types for the current network capacity allocation cycle.

In some aspects, the method also includes determining a total allocation for a particular allocation cycle based on a summation of network capacity allocation parameters corresponding to the particular allocation cycle for the plurality of service flow types, determining a remaining network capacity for the particular allocation cycle based on previous allocation cycles; and allocating the remaining network capacity based on the network capacity allocation parameters corresponding to the particular allocation cycle and network capacity allocation parameters corresponding to a previous allocation cycle in response to the remaining network capacity being less than the total allocation for the particular allocation cycle; and allocating the remaining network capacity based on the network capacity allocation parameters corresponding to the particular allocation cycle in response to the remaining network capacity being greater than or equal to the total allocation for the particular allocation cycle.

In some aspects, the method includes in response to the remaining network capacity being less than the total allocation for the particular allocation cycle, summing, for each service flow, the service flow's network capacity allocation parameters for the particular allocation cycle and network capacity allocation parameters corresponding to the previous allocation cycle; and allocating the remaining network capacity to each service flow in proportion to the sums for each service flow.

In some aspects, the method includes receiving data for transmission, determining a transmission data type of the received data based on one or more of: a source service access point, a destination service access point, and a classification of a payload of the data, and associating the received data with a service flow type based on the transmission data type.

In some aspects, the method includes classifying protocol headers to determine the classification of the transmission data type. In some aspects, the method also includes classifying the transmission data type into at least one of bursty, video, file download, and VoIP. In some aspects, the method also includes allocating network capacity during a first time period based on the set of network capacity allocation cycles; and allocating network capacity during a non-overlapping second time period based on a second set of network capacity allocation cycles. In some aspects, the method also includes iteratively performing, for each of the at least three ordered network capacity allocation cycles: allocating the determined amounts of data to transmit for each of the plurality of service flow type to a plurality of user terminals based on allocation parameters associated with each of the plurality of user terminals.

In some aspects, the method also includes determining a user terminal profile for each of the plurality of user terminals, each user terminal profile defining at least three different allocation parameters for user terminal data associated with a service flow type, the at least three different allocation parameters associated with at least three different ordered network capacity allocation cycles respectively; and iteratively performing, for each of the at least three ordered network capacity allocation cycles: allocating a portion of a determined amount for a service flow type to a user terminal based at least in part on the allocation parameter defined by the determined user terminal profile for the user terminal corresponding to the current network capacity allocation cycle, wherein the transmitting of the determined amounts for each of the plurality of service flow types for the current network capacity allocation cycle includes transmitting the allocated portion for the user terminal.

Another aspect disclosed is an apparatus for allocating network capacity over a communication channel of a network. The apparatus includes an electronic hardware processor, an electronic hardware memory, operably coupled to the electronic hardware processor, and storing instructions that when executed cause the electronic hardware processor to perform a method of allocating network capacity over a communication channel of a network. The electronic hardware processor is configured to determine a transmission profile for each of a plurality of service flow types, each transmission profile defining at least three different network capacity allocation parameters for a set of at least three different ordered network capacity allocation cycles, iteratively performing, for each of the at least three ordered network capacity allocation cycles: selecting, for each service flow type, the network capacity allocation parameters in each service flow type's transmission profile associated with a current network capacity allocation cycle of the at least three ordered network capacity allocation cycles, determining amounts of data to transmit for each of the plurality of service flow types based, at least in part, on the selected network capacity allocation parameters for the current network capacity allocation cycle, and transmitting over the communication channel, the determined amounts for each of the plurality of service flow types for the current network capacity allocation cycle.

In some aspects, the electronic hardware memory stores further instructions that when executed cause the electronic hardware processor to: determine a total allocation for a particular allocation cycle based on a summation of network capacity allocation parameters corresponding to the particular allocation cycle for the plurality of service flow types, determine a remaining network capacity for the particular allocation cycle based on previous allocation cycles, allocate the remaining network capacity based on the network capacity allocation parameters corresponding to the particular allocation cycle and network capacity allocation parameters corresponding to a previous allocation cycle in response to the remaining network capacity being less than the total allocation for the particular allocation cycle, and allocate the remaining network capacity based on the network capacity allocation parameters corresponding to the particular allocation cycle in response to the remaining network capacity being greater than or equal to the total allocation for the particular allocation cycle.

In some aspects of the apparatus, the electronic hardware memory stores further instructions that when executed cause the electronic hardware processor to in response to the remaining network capacity being less than the total allocation for the particular allocation cycle: summing, for each service flow, the service flow's network capacity allocation parameters for the particular allocation cycle and network capacity allocation parameters corresponding to the previous allocation cycle; and allocating the remaining network capacity to each service flow in proportion to the sums for each service flow.

In some aspects of the apparatus, the electronic hardware memory stores further instructions that when executed cause the electronic hardware processor to receive data for transmission, determine a transmission data type of the received data based on one or more of: a source service access point, a destination service access point, and a classification of a payload of the data; and associate the received data with a service flow type based on the transmission data type.

In some aspects of the apparatus, the electronic hardware memory stores further instructions that when executed cause the electronic hardware processor to classify protocol headers to determine the classification of the transmission data type. In some aspects, the electronic hardware memory stores further instructions that when executed cause the electronic hardware processor to classify the transmission data type into at least one of bursty, video, file download, and VoIP.

In some aspects, the electronic hardware memory stores further instructions that when executed cause the electronic hardware processor to allocate network capacity during a first time period based on the set of network capacity allocation cycles; and allocate network capacity during a non-overlapping second time period based on a second set of network capacity allocation cycles. In some aspects, the electronic hardware memory stores further instructions that when executed cause the electronic hardware processor to for each of the at least three ordered network capacity allocation cycles: allocate the determined amounts of data to transmit for each of the plurality of service flow type to a plurality of user terminals based on allocation parameters associated with each of the plurality of user terminals.

In some aspects of the apparatus, the electronic hardware memory stores further instructions that when executed cause the electronic hardware processor to determine a user terminal profile for each of the plurality of user terminals, each user terminal profile defining at least three different allocation parameters for user terminal data associated with a service flow type, the at least three different allocation parameters associated with at least three different ordered network capacity allocation cycles respectively, and iteratively perform, for each of the at least three ordered network capacity allocation cycles: allocate a portion of a determined amount for a service flow type to a user terminal based at least in part on the allocation parameter defined by the determined user terminal profile for the user terminal corresponding to the current network capacity allocation cycle. In these aspects, the transmitting of the determined amounts for each of the plurality of service flow types for the current network capacity allocation cycle includes transmitting the allocated portion for the user terminal.

Another aspect disclosed is an apparatus for allocating network capacity over a communication channel of a network. The apparatus includes means for allocating different proportions of available network capacity to a plurality of service flow types during each of at least three ordered network capacity allocation cycles; and means for transmitting data comprising the plurality of service flow types according to the allocations. In some aspects, the means for allocating different proportions of available network capacity is configured to determining a transmission profile for each of the plurality of service flow types, each transmission profile defining at least three different network capacity allocation parameters for the at least three different ordered network capacity allocation cycles, and allocate the different proportions in accordance with the determined transmission profiles. In some of these aspects, the means for allocating different proportions of available network capacity is further configured to select, for each service flow type, the network capacity allocation parameters in each service flow type's transmission profile associated with a current network capacity allocation cycle of the at least three ordered network capacity allocation cycles, and determine amounts of data to transmit for each of the plurality of service flow types based, at least in part, on the selected network capacity allocation parameters for the current network capacity allocation cycle. In some aspects of this apparatus, the means for allocating different proportions of available network capacity is further configured to transmit over the communication channel, the determined amounts for each of the plurality of service flow types for the current network capacity allocation cycle. In some of these aspects, the means for allocating different proportions of available network capacity is further configured to determine a total allocation for a particular allocation cycle based on a summation of network capacity allocation parameters corresponding to the particular allocation cycle for the plurality of service flow types, determine a remaining network capacity for the particular allocation cycle based on previous allocation cycles, allocate the remaining network capacity based on the network capacity allocation parameters corresponding to the particular allocation cycle and network capacity allocation parameters corresponding to a previous allocation cycle in response to the remaining network capacity being less than the total allocation for the particular allocation cycle, and allocate the remaining network capacity based on the network capacity allocation parameters corresponding to the particular allocation cycle in response to the remaining network capacity being greater than or equal to the total allocation for the particular allocation cycle.

In some aspects of the apparatus, the means for allocating different proportions of available network capacity is further configured to in response to the remaining network capacity being less than the total allocation for the particular allocation cycle: sum each service flow's network capacity allocation parameters for the particular allocation cycle and network capacity allocation parameters corresponding to the previous allocation cycle, and allocate the remaining network capacity to each service flow in proportion to the sums for each service flow. In some aspects of the apparatus, the means for allocating different proportions of available network capacity is further configured to receive data for transmission, determine a transmission data type of the received data based on one or more of: a source service access point, a destination service access point, and a classification of a payload of the data, and associate the received data with a service flow type based on the transmission data type.

In some aspects of the apparatus, the means for allocating different proportions of available network capacity is further configured to classify protocol headers to determine the transmission data type. In some aspects, the means for allocating different proportions of available network capacity is further configured to classify the transmission data type into at least one of bursty, video, file download, and VoIP. In some aspects, the means for allocating different proportions of available network capacity is further configured to: allocate different proportions of available network capacity during a first time period based on the at least three network capacity allocation cycles; and allocate network capacity during a non-overlapping second time period based on a second set of at least three network capacity allocation cycles.

Another aspect disclosed is a non-transitory computer readable medium comprising instructions that when executed cause a processor to perform a method of allocating network capacity over a communication channel of a network, the method comprising: determining a transmission profile for each of a plurality of service flow types, each transmission profile defining at least three different network capacity allocation parameters for a set of at least three different ordered network capacity allocation cycles; iteratively performing, for each of the at least three ordered network capacity allocation cycles: selecting, for each service flow type, the network capacity allocation parameters in each service flow type's transmission profile associated with a current network capacity allocation cycle of the at least three ordered network capacity allocation cycles, determining amounts of data to transmit for each of the plurality of service flow types based, at least in part, on the selected network capacity allocation parameters for the current network capacity allocation cycle, and transmitting over the communication channel, the determined amounts for each of the plurality of service flow types for the current network capacity allocation cycle.

BRIEF DESCRIPTION OF THE DRAWINGS

The present disclosure is described in conjunction with the figures:

FIG. 5 shows a plurality of transmission profiles in at least one operative embodiment.

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
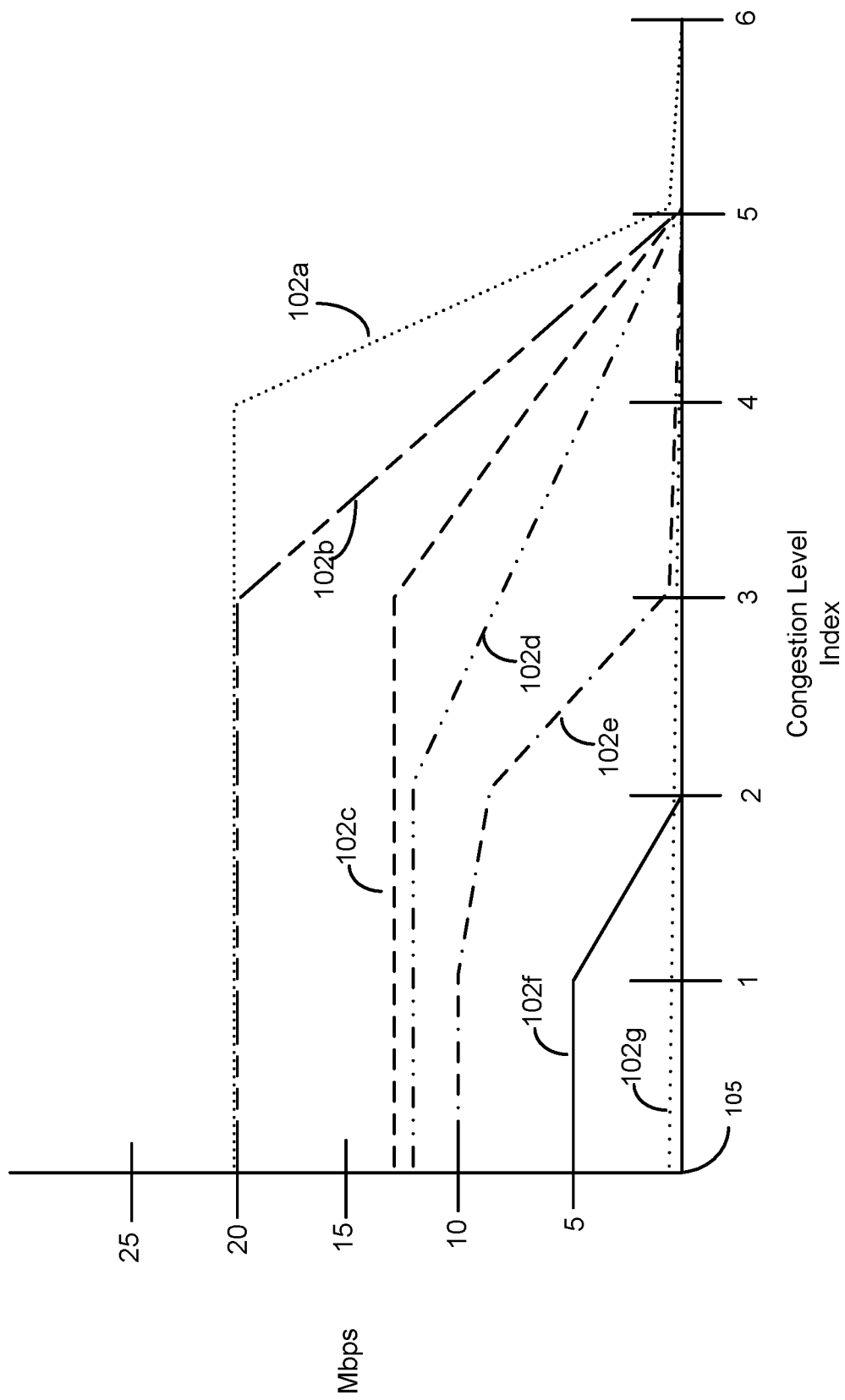
FIG. 1 shows an allocation of network capacity to a plurality of network data flows over a continuum of congestion levels.

FIG. 1 shows an allocation of network capacity to a plurality of network data flows 102a-g over a variety of congestion levels. As shown, each of the flows 102a-g are allocated a different proportion of available network capacity as the level of congestion increases along the x axis 105 from zero (0) to six (6). For example, when a congestion level index is zero (0), flows 102a and 102b are allocated 20 Mbps of network capacity, flow 102c is allocated approximately 12.5 Mbps of network capacity, flow 102d is allocated approximately 12 Mbps of capacity, flow 102e 10 Mbps of network capacity, flow 102f 5 Mbps of network capacity, and flow 102g approximately 0.5 Mbps of network capacity. These allocations remain constant at a congestion level index of "1."

At a congestion level value of two (2), the allocation to flows 102a-d, still remains unchanged, whereas flow 102e's allocation has dropped from 10 Mbps to approximately 8 Mbps. Flow 102f's allocation has dropped to zero (0) Mbps, while flow 102g's allocation is holding steady at approximately 0.5 Mbps.

At a congestion level value of three (3), the allocation to flows 102a-c are unchanged relative to a congestion level of zero (0). However, flow 102d's allocation has dropped relative to 102d's allocation at a congestion level of two (2). Flow 102d is allocated approximately 8 Mbps at a congestion level of three (3). Flow 102e's allocation has also dropped to approximately 0.5 Mbps from approximately 8 Mbps at the congestion level index value of two (2).

At a congestion level value of four (4), only flow 102a remains unchanged from the congestion level of zero (0). Flow 102b is now allocated approximately 12 Mbps, flow 102c 7.5 Mbps, flow 102d 4 Mpbs, flow 102e zero (0) Mbps, flow 102f zero (0) Mbps, and flow 102g remains steady at approximately 0.5 Mbps.

At a congestion level of five (5), flow 102a is allocated approximately 1 Mbps, and flows 102b-f are allocated zero Mbps.

Note that not only the absolute amount of capacity is reduced to the flows 102a-g as the congestion level moves from zero (0) to six (6), but the proportion of available capacity allocated to each of the flows changes. The table below shows an approximation of how the proportions change as the level of congestion changes:

TABLE 1

| Flow | Congestion Level Index | | | | |
| --- | --- | --- | --- | --- | --- |
|  | 1 | 2 | 3 | 4 | 5 |
| 102a | 25.00% | 27.40% | 32.52% | 45.45% | 100.00% |
| 102b | 25.00% | 27.40% | 32.52% | 27.27% | 0.00% |
| 102c | 15.63% | 17.12% | 20.33% | 17.05% | 0.00% |
| 102d | 15.00% | 16.44% | 13.01% | 9.09% | 0.00% |
| 102e | 12.50% | 10.96% | 0.81% | 0.00% | 0.00% |
| 102f | 6.25% | 0.00% | 0.00% | 0.00% | 0.00% |
| 102g | 0.63% | 0.68% | 0.81% | 1.14% | 0.00% |
| Total | 100.00% | 100.00% | 100.00% | 100.00% | 100.00% |

As shown in Table 1, flow 102a for example, receives 25% of capacity at a congestion level of one (1), but 45% of available network capacity at a congestion level of four (4). Thus, the methods and systems disclosed provide for multi-level allocation of network capacity to a plurality of traffic flows. The proportion of network capacity allocated to each traffic flow can vary for each level of congestion (or each amount of available network capacity). This provides the ability to ensure scarce network capacity is provided to the highest priority flows.

Figure 2:
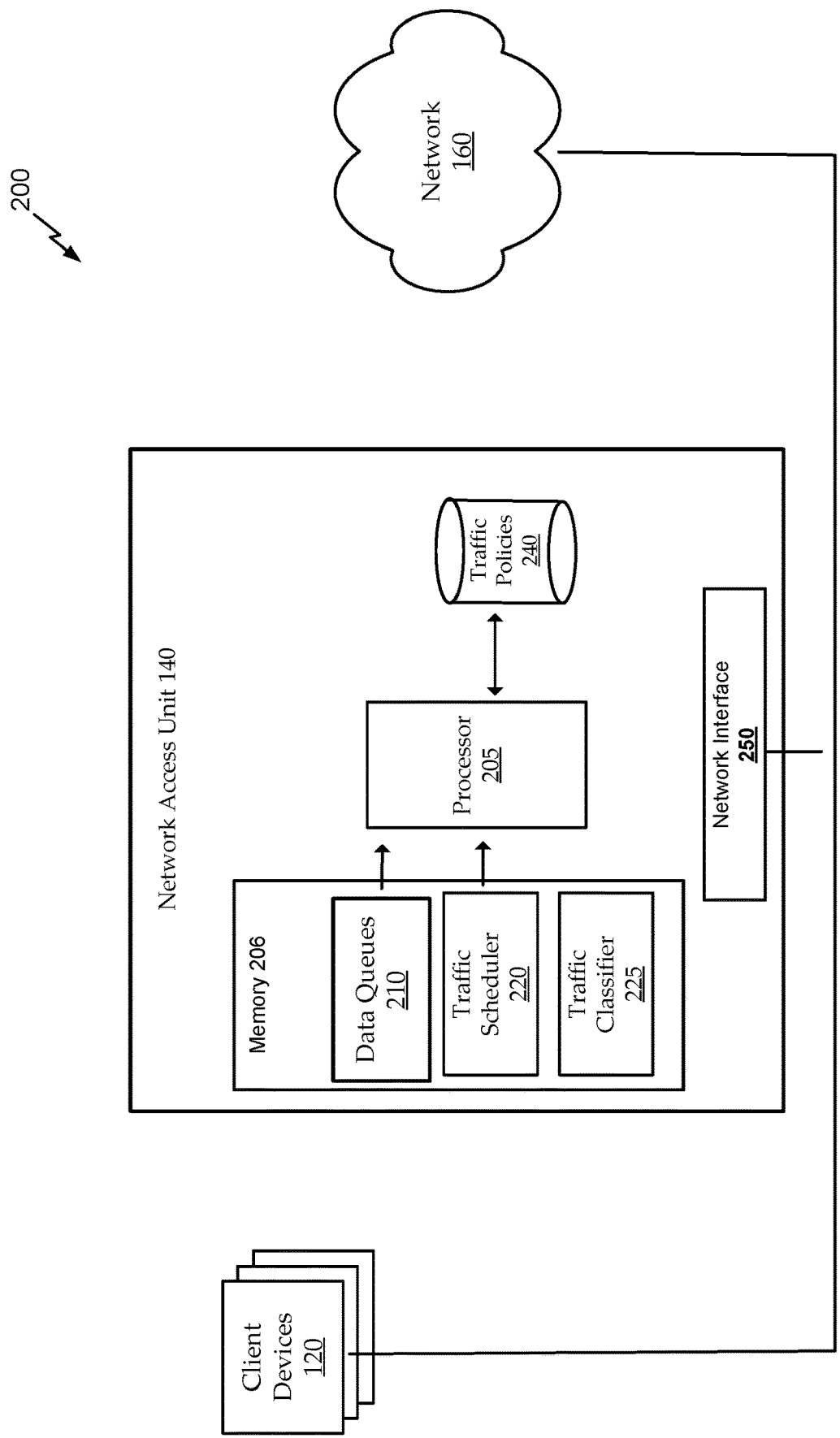
FIG. 2 is a block diagram of a system implementing at least some of the disclosed embodiments.

FIG. 2 is a block diagram of a system implementing at least some of the disclosed embodiments. The system 200 includes client devices 120, a network access unit 140, and a network 160. The network access unit 140 is responsible for allocating capacity of the network 160 to traffic generated by the client devices 120. During operation of the system, at some times the data generated by the client devices 120 may exceed a capacity of the network 160. Therefore, the network access unit 140 may queue and/or prioritize access to the network 160 by the client devices 120.

The network access unit includes an electronic hardware processor 205 and an electronic hardware memory 206. The electronic hardware memory 206 stores data queues 210, a traffic scheduler 220, and a traffic classifier 225. The data queues 210 may store data transmitted by the client devices 120 that has not yet been transmitted over the network 160. The traffic scheduler 220 may be a portion of the memory 206 that stores instructions that configure the processor 205 to perform one or more functions that implement one or more portions of the embodiments disclosed herein. For example, the traffic scheduler may configure the processor 205 to transmit data over the network 160 according to one or more transmission profiles.

The traffic classifier 225 may be a portion of the memory 206 that stores instructions that configure the processor 205 to classify network traffic received from one or more client devices 120. For example, traffic from the client devices 120 may be associated with a service flow type by the traffic classifier 225. In some aspects, a service flow type may characterize the nature of data transmitted within a network conversation. A network conversation may be an identification of network data that associates two end points of a network communication flow. For example, in some aspects, a network conversation may be identified to be a unique transmission control protocol (TCP) connection or UDP (user datagram protocol) "connection." For example, a combination of source Internet Protocol (IP) address, destination IP address, source service access point (SAP) and destination service access point (SAP) may uniquely identify a network conversation in some aspects. In some aspects, a network conversation may identify the flow of network data between a source and multiple destinations. For example, in some aspects, a source node or device may multicast network communication to a multi-cast address, which is routed to a plurality of devices on the network. The network conversation may then identify data transmitted by this particular source device to a particular multicast address, such as a multicast IP address. In some aspects, a service flow type may characterize data within a network conversation as one of bursty, video file download and/or Voice Over IP.

The network access unit 140 also includes a data store that includes traffic policies 240. The traffic policies 240 define traffic scheduling parameters for a plurality of service flow types. For example, a particular traffic policy may define an amount of network capacity allocated to a particular traffic flow type under particular network conditions or available network capacities. The network interface 250 provides access by the network access unit 140 to the client devices 120 and network 160.

Figure 3:
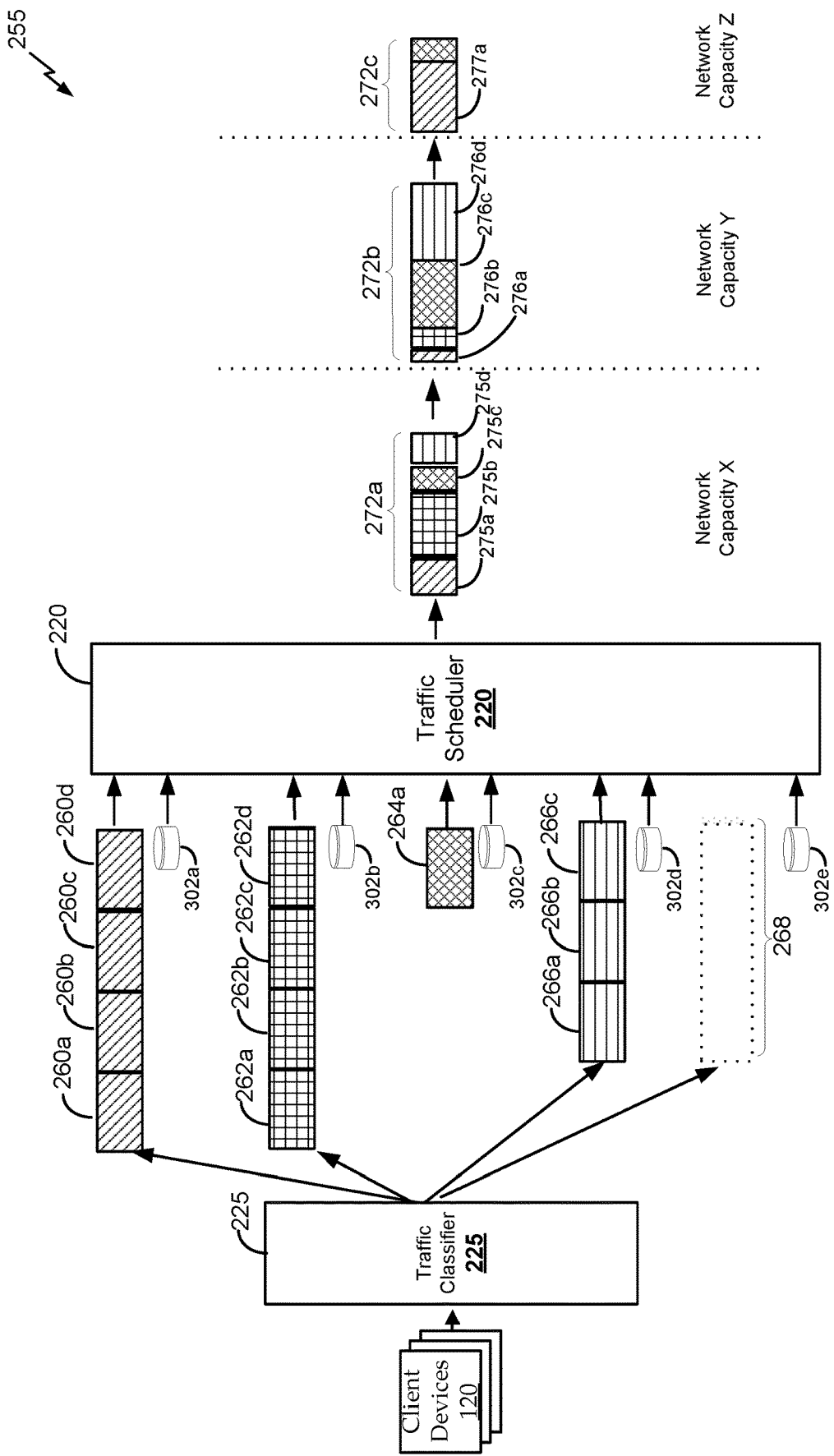
FIG. 3 is a data flow diagram of one example embodiment.

FIG. 3 is a data flow diagram of one example embodiment. The data flow 255 shows data flowing from the client device(s) 120 to the traffic classifier 225, through to data queues 260, 262, 264, 266, and 268 to the traffic scheduler 220. The traffic scheduler then periodically schedules a cycle of data allocations 272a-c for transmission on a network.

As discussed above, the traffic classifier 225 may classify and/or associate data ready for transmission with a service flow type. Examples of service flow types include busty, video file download, and/or Voice Over IP. These are only examples and the solutions disclosed herein contemplate any number of service flow types.

The data flow 255 also illustrates queues 260 (comprised of queue elements 260a-d), 262 (comprised of queue elements 262a-d), 264 (comprised of queue element 264a), 266 (comprised of queue elements 266a-c), and queue 268 (which is empty). Some implementations may designate a particular queue for each service flow type classified by the traffic classifier 225. As shown, after classifying data from client devices 120 as a particular service flow type, the traffic classifier 225 may queue the data onto an appropriate queue 260, 262, 264, 266, or 268.

The traffic scheduler 220 may cyclically schedule data for transmission from the queues 260, 262, 264, 266, and 268 based on corresponding transmission profiles 302a-e respectively, and a current network condition. Results of these cyclic allocations are shown as allocations 272a-c.

In the embodiment shown in FIG. 3, one network condition considered by traffic scheduler 220 when allocating service flow type data during an allocation cycle is a current capacity of the network. Allocation 272a is transmitted when the network capacity has a hypothetical "X" value, allocation 272b is determined based on a network capacity with a hypothetical "Y" value, and allocation 272c is determined based on a hypothetical network capacity value of "Z." X, Y, and Z are intended to represent arbitrary network capacity values. Each of these "X," "Y," and "Z," values may be considered by the traffic scheduler 220 when determining amounts of data service flow type data to allocate in each of the allocations 272a-c. How the example "X," "Y," and "Z" values are computed may vary by embodiment. For example, in some aspects, the "X," "Y," and "Z" values may indicate an amount of data that can be transmitted over the network in the current allocation cycle. This measurement itself may be determined in various manners. For example, any one or more of the maximum capacity, average throughput, packet loss measurements, buffer or queue size measurements within the network, number of retransmissions within a time period, latency measurements, throughput measurements may be considered when determining "X," "Y," and "Z" values.

Each of allocations 272a-c include portions of data from one or more of the queues, as shown by shading that matches portions of the allocations 272a-c and the queues 260, 262, 264, 266, and 268. For example, portion 275a represents data from queue 260 (marked with equivalent shading), portion 275b represents data from queue 262, 275c represents data from queue 264, and portion 275d represents data from queue 266. Note that the proportions of data from each queue vary across allocations 272a-c. For example, while data from queue 262 (275b) represents ~50% of the data included in allocation 272a, the proportion of data from queue 262 is much less than 50% in allocation 272b (shown as 276b). Further, no data is included in allocation 272c from queue 262.

Similarly while data from queue 260 represents a relatively small portion of allocation 272a (shown as 275a), data from queue 260 represents an even smaller portion of allocation 272b (shown as 276a), and more than 50% of allocation 272c (shown as 277a). These variations in the proportion of each service flow type data in each of the allocations 272a-c may be a result of the consideration of the different network capacities available (X, Y, and Z) during each allocation 272a-c.

Figure 4:
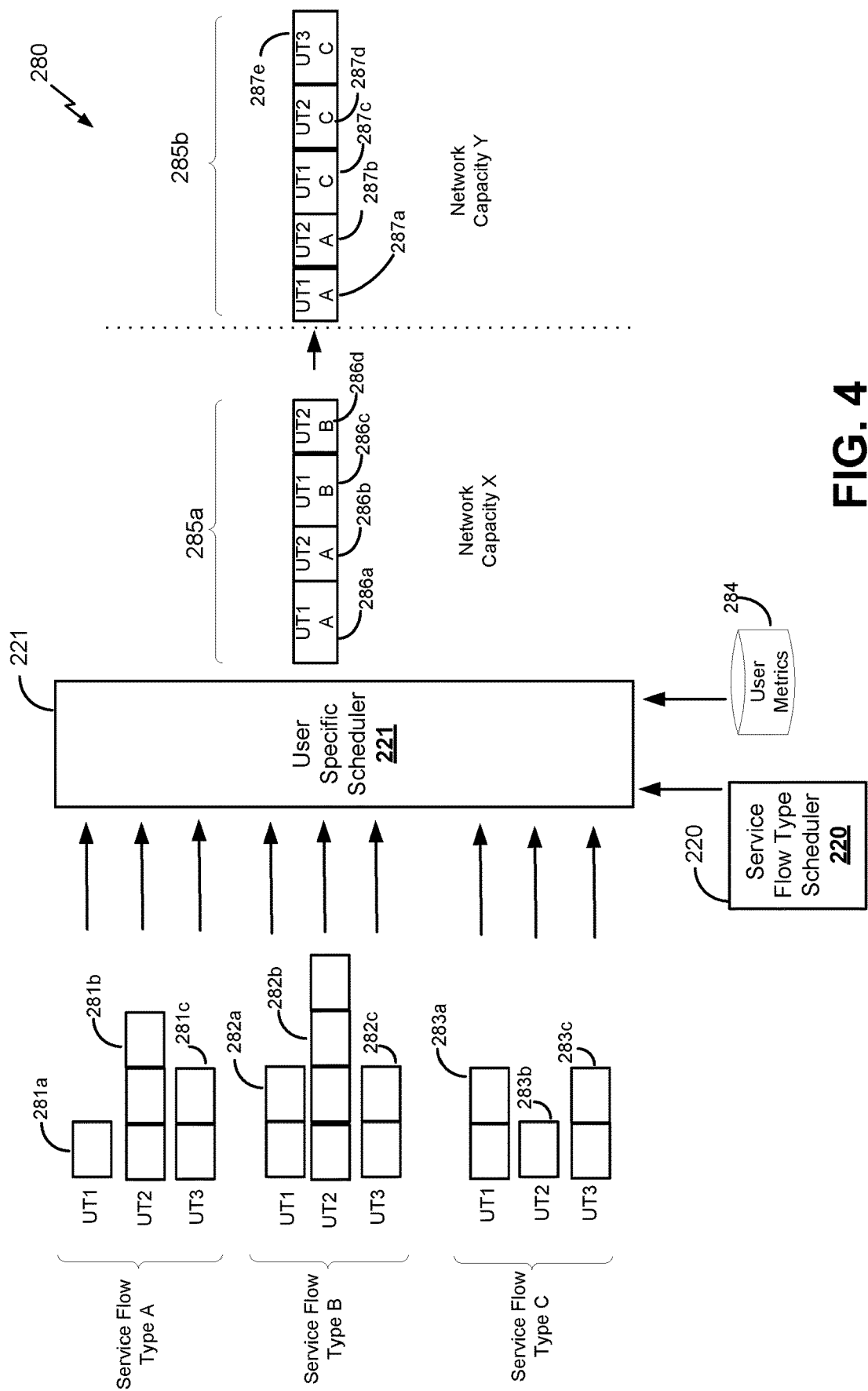
FIG. 4 is a data flow diagram of another example embodiment.

FIG. 4 is a data flow diagram of another example embodiment. FIG. 4 shows a plurality of data queues 281a-c, 282a-c, and 283a-c. Each of the data queues stores data from a particular user terminal and of a particular service flow type. In some aspects, the data queues 281, 282, and 283 may have been populated by the traffic classifier 225, shown in FIG. 3. For example, queues 281a-c store data of service flow type "A," queues 282a-c store data of service flow type "B," while queues 283a-c store data of a service flow type "C." Each of queues 281a, 282a and 283a store data transmitted by a user terminal 1 (UT1), each of queues 281b, 282b, and 283b store data transmitted by a user terminal 2 (UT2), while each of queues 281c, 282c, and 283c store data transmitted by user terminal 3 (UT3).

The traffic scheduler 220, shown in FIG. 4 as service flow type scheduler 220 may be configured to determine an allocation of data for each service flow (A-C in FIG. 4) during a particular allocation cycle, sub-cycle, or series of sub-cycles. The allocation amounts for each service flow type may be provided to a user specific scheduler 221. Given the allocations for each service flow during a cycle, the user specific scheduler 221 may determine how a particular allocation of service flow data will be apportioned to a plurality of user terminals with data to send. For example, the user specific scheduler 221 may determine how much data from each of UT1, UT2, and UT3 will be allocated in a particular allocation cycle to provide the allocated amount for service flow type "A." provided by the service flow type scheduler 220. The data to provide this allocation may be obtained from the queues 281a-c.

To make this determination, the user specific scheduler 221 may also rely on user metrics 284. User metrics 284 may include, for example, information indicating a priority of a particular user relative to other users. This information may include information such as subscriber plan information for a user, account status of a user (for example, whether the user is paid in full, or late in a subscriber payment), usage information of a user (for example, if the user's usage has exceeded a usage limit provided for by their data access plan, etc.). The user specific scheduler 221 may then prioritize and allocate data for a service flow based on the user metrics 284, and based on which users have data waiting in the queues 281a-c, 282a-c, and 283a-c.

The results of this allocation are shown in FIG. 4 as allocations 285a-b. Allocation 285a includes data from UT1 service flow type "A" 286A, UT2 service flow type "A" 286b, UT1 service flow type "B" 286c, and UT2 service flow type "B" 286d. In some aspects, user terminal (UT) data may be allocated to an allocation cycle in a similar manner as service flow type data is allocated, as described above.

Allocation 285b includes UT 1 service flow "A" data 287a, UT2 service flow "A" data 287b, UT1 service flow type "C" data 287c, UT2 service flow type "C" data 287d, and UT3 service flow type "C" data 287e. Variations on the amount of each user terminals data within a service flow type in each of allocations 285a-b may be based on user terminal scheduling decisions made by the user specific scheduler 221 based at least in part on the user metrics 284.

FIG. 5 shows a plurality of transmission profiles in at least one operative embodiment. The transmission profiles 302a-d may each correspond to an individual service flow type, in that allocations of data for transmission for the individual service flow type may be controlled at least in part by one of the example transmission profiles 302a-d. For example, the traffic scheduler 220 may consult one of the transmission profiles 302a-d when determining how much data for a particular service flow type should be transmitted during an allocation cycle and/or allocation sub-cycle.

Each of the "rows" of the example transmission profiles 302a-d define allocations for a particular sub-cycle in a cyclic data allocation process for transmission over a network (discussed in more detail below). For example, each of 303a-b, 305a-b, 307a-b, and 309a-b define that in a first, second, third, and fourth allocation sub-cycle, a service flow type corresponding to transmission profile 302a should be allocated 5, 10, 7, and 4 "units" in each of the sub-cycles respectively. In some aspects, the 'units" in allocations 303b, 305b, 307b, and 309b for example, indicate an absolute amount of data that can be allocated to the corresponding service flow type during a particular sub-cycle. For example, the units may be in bytes, mega-bytes, gigabytes, etc. In some other aspects, the allocations 303b, 305b, 307b, and 309b may be indicative of a data rate than should be achieved for the corresponding service flow type during the corresponding sub-cycles. For example, the "units" may represent mega-bits per second, mega-bytes per second, etc. When the allocations indicate a rate, determining an amount of data to transmit for a particular service flow type may depend on a time quantum represented by a particular sub-cycle (i.e. an amount of time on a network for which data is being allocated during a particular cycle or sub-cycle).

In some aspects, the units defined by the transmission profiles 302a-d may define percentages of available capacity to allocate to a corresponding service flow type. For example, in some aspects, the transmission profile 302 may indicate that five percent of available network capacity should be allocated to the corresponding service flow type during sub-cycle 1, 10 percent in sub-cycle 2, seven (7) percent in sub-cycle 3, and four (4) percent in sub-cycle 4. In some aspects, these percentages may define an allocation similar to that shown in Table 1, discussed above in relation to FIG. 1.

Figure 6:
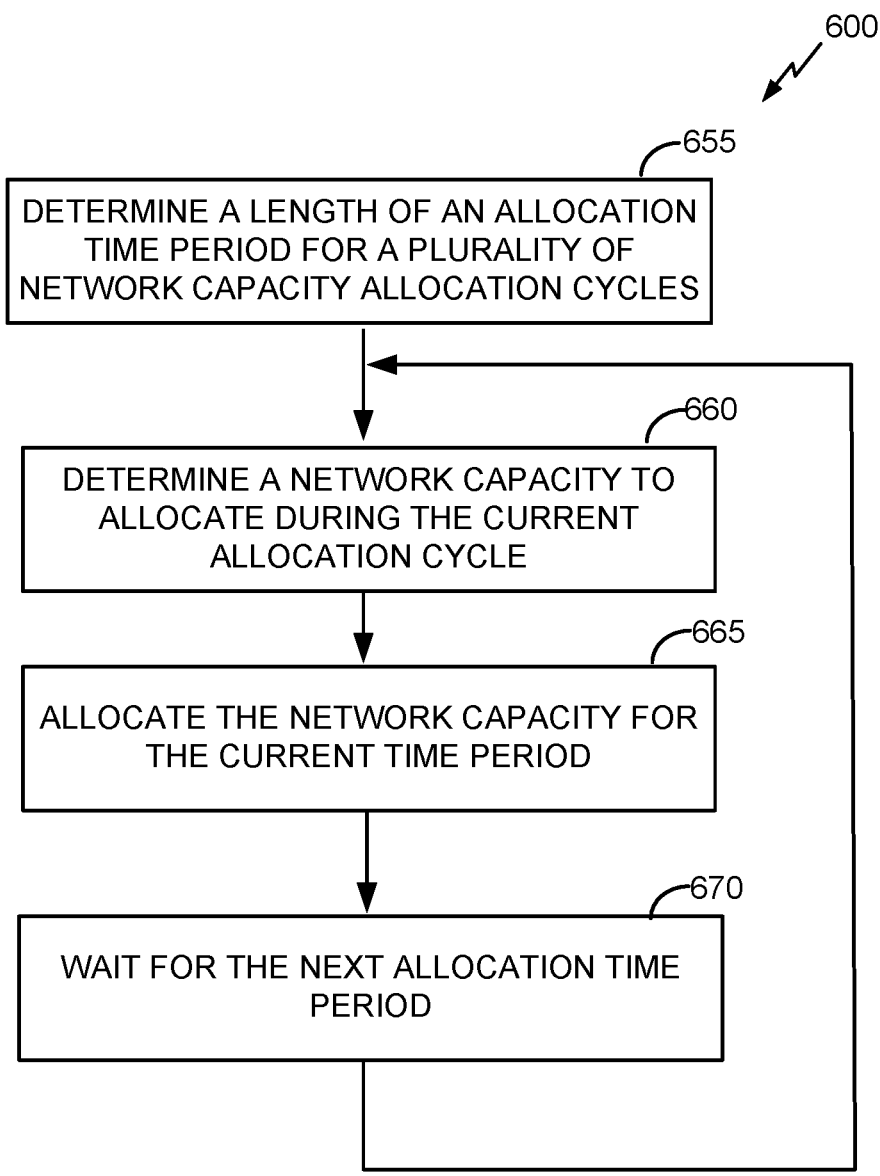
FIG. 6 is a flowchart for an example method of allocating network capacity.

FIG. 6 is a flowchart for an example method of allocating network capacity. In some aspects, the process 600 shown in FIG. 6 may be implemented by the network access unit 140 shown in FIG. 2. For example, in some aspects, the traffic scheduler 220 may store instructions that configure the processor 205 to perform one or more of the functions discussed below with respect to FIG. 6.

In block 655, an allocation time period for a plurality of network capacity allocation cycles is determined. For example, network capacity may be allocated in process 600 via a plurality of cycles. In some aspects, the cycles may be continuous, in that there is no explicit upper bound on the number of cycles in which network capacity may be allocated. In some aspects, the allocation of network capacity may be divided up into discrete time quanta. For example, network capacity may be allocated at each 1, 5, 10, 20, 50, or 100 milliseconds for example. Block 655 determines the time period for a network capacity allocation cycle.

In some aspects, the determination of a length of the time period for an allocation cycle may not be explicit, but instead it may be inherent in the design itself. For example, in some aspects, processor instructions may be hard coded to utilize a fixed length allocation time period. In these aspects, no dynamic run-time determination of a length may be performed. Instead, in these aspects, the determination of a length of a time period may be inherent in the execution of process 600 itself. For example, some aspects may run process 600 every 50 milliseconds, with process 600 allocating network capacity available during successive time quantums of 50 milliseconds.

In block 660, a network capacity to allocate during the current allocation cycle is determined. In some aspects, this determination may be based on the length of the time period determined in block 655. In some aspects, this determination may be based on a current capacity of the network, which may vary over time. Therefore, some aspects of block 660 may include receiving input indicating a current capacity of the network. For example, input may be received from one or more network monitors indicating one or more of a packet loss rate, packet latency, network jitter, or other network statistics. The current capacity of the network may then be derived from one or more of these statistics.

As an example of determining a current network capacity to allocate, if a current capacity of a network is 50 megabits per second (Mbps), and a length of the time period of block 655 is 100 milliseconds, then the network capacity for allocation during the current allocation cycle in block 660 is 5,000,000 bits or 625,000 bytes.

In block 665, the network capacity for the current allocation cycle is allocated. In some aspects, the allocation may be performed in accordance with the process described with respect to FIG. 7, discussed below.

Block 670 waits for the next allocation time period. For example, if process 600 allocates network capacity at 10 millisecond intervals, block 670 may wait until the next 10 millisecond interval occurs. In some aspects, block 670 may include the collection of metric information relating to the available network capacity during the next time period. As computer networks are dynamic in nature, the available network capacity may vary with each time period referenced in process 600. In some other aspects of block 670, no wait may be performed. After block 670 is performed, process 600 returns to block 660 and processing repeats as described above.

Figure 7:
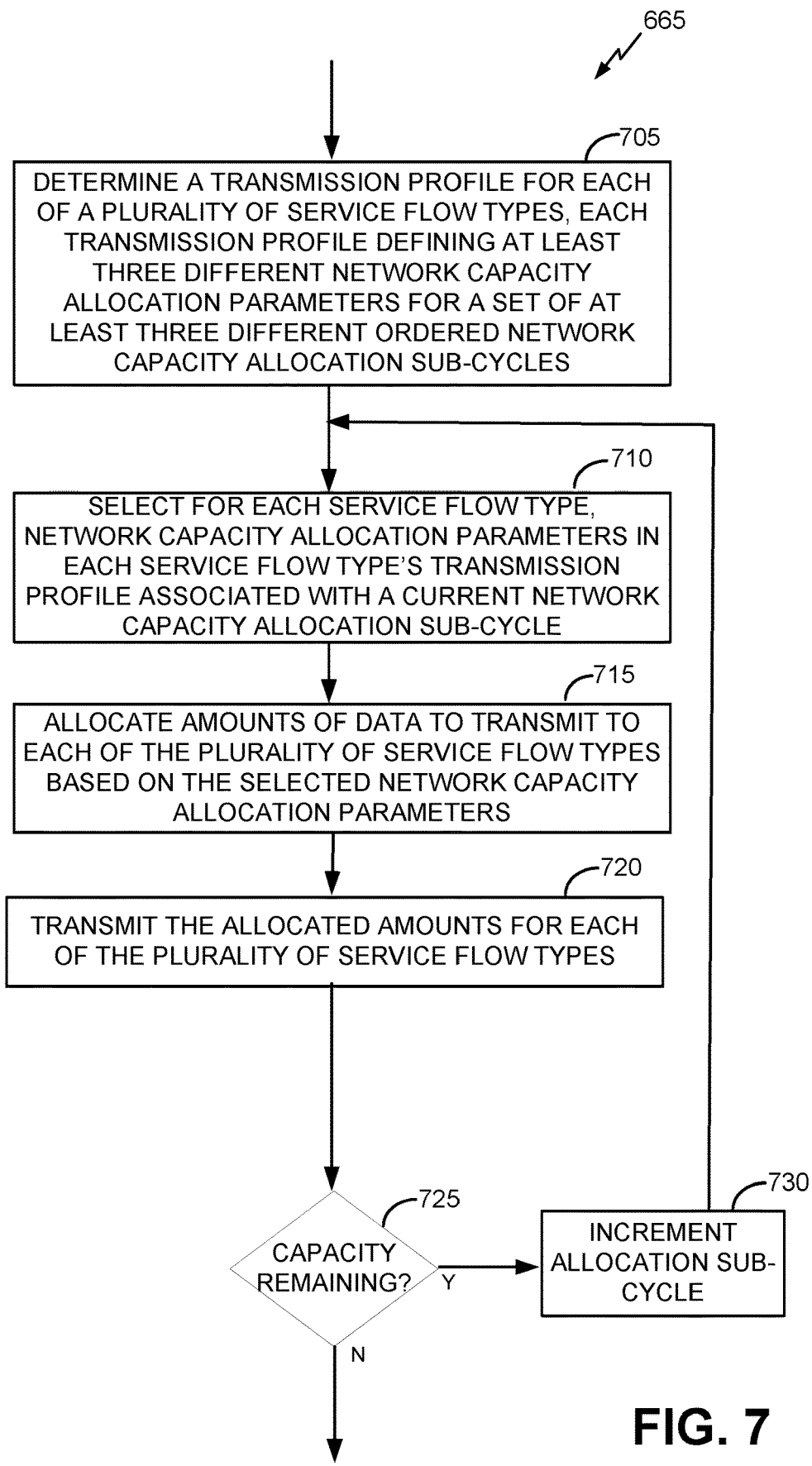
FIG. 7 is a flowchart of a method of allocating capacity of a network.

FIG. 7 is a flowchart of a method of allocating capacity of a network. In some aspects, the process 665 shown in FIG. 7 may be performed by the network access unit 140. For example, in some aspects, instructions stored in the traffic scheduler 220 may configure the processor 205 to perform one or more of the functions of process 665, discussed below. Process 665 described with respect to FIG. 7 may be performed in block 665 of FIG. 6 in some aspects. In some aspects, process 665 allocates a network capacity within one cycle of process 600, described above with respect to FIG. 6. For example, the sub-cycles of process 665, described below, may represent divisions or sub-components of a single cycle of process 600, described above. Thus, process 665 may represent a cyclic allocation process nested inside another cyclic allocation process (600).

In some aspects, process 665 allocates a network capacity in a number of sub-cycles. Each sub-cycle may allocate a portion of this network capacity until the entire network capacity is allocated, or there is no more data waiting to be transmitted. Each sub-cycle may allocate a portion of the network capacity based on allocation parameters associated with a sub-cycle as defined in transmission profiles, such as the example transmission profiles shown in FIG. 5.

In some aspects, process 665 running on an electronic processor, such as the electronic processor 205 shown in FIG. 2, represents a means for allocating different proportions of available network capacity to a plurality of service flow types during each of at least three ordered network capacity allocation cycles, and also a means for transmitting data comprising the plurality of service flow types according to the allocations during the at least three ordered network capacity allocation cycles.

In block 705, a transmission profile for each of a plurality of service flow types is determined. Each transmission profile may define at least three different network capacity allocation parameters for a set of at least three different ordered network capacity allocation sub-cycles. For example, as shown in FIG. 5, the transmission profiles 302a-d each define at least three different ordered network capacity allocation parameters. For example, network capacity allocation parameters 303b, 305b, 307b, and 309b are defined by transmission profile 302a for allocation cycles indicated in 303a, 305a, 307a, and 309a respectively, while allocation parameters 311b, 313b, 315b, and 317b are defined by transmission profile 302b for cycles indicated by 311a, 313a, 315a, and 317a respectively. The sub-cycles referenced as part of the discussion of FIG. 7 may be performed within one cycle of process 600, discussed above with respect to FIG. 5.

In block 710, network capacity allocation parameters are selected for each service flow type of the plurality of service flows. The selected parameters correspond to a current network capacity allocation cycle. For example, in a first allocation cycle such as the cycle represented by 303a and 311a of FIG. 5, the parameters selected may include 303b for a first service flow type corresponding to transmission profile 302a and 311b for a second service flow type corresponding to transmission profile 302b.

In block 715, amounts of data to transmit for each of the plurality of service flow types are determined. The amounts may be determined based on the selected network capacity allocation parameters. In some aspects, the selected network capacity allocation parameters represent a data rate to allocate to a corresponding service flow type. For example, a value of five (5) for allocation parameter 306a may indicate the service flow type corresponding to transmission profile 302 should be allocated 5 Mbps in allocation cycle one (1). In these aspects, the amount of data to transmit may be determined by dividing the rate by a time period represented by an allocation cycle. For example, if a rate indicated by an allocation parameter is 5 Mbps, and an allocation cycle represents 100 milliseconds, then 500,000 bytes may be allocated to the corresponding service flow type during the current allocation cycle.

In some aspects, the selected network capacity allocation parameters may represent a number of bytes to allocate to the corresponding service flow in the current allocation cycle. In some aspects, the allocation parameters 306a-d and 308a-d may represent a proportional amount of network capacity to allocate to the respective service flow during a particular allocation cycle. For example, in some aspects, the allocation parameters 306a-d and 308a-d for example may represent a number of bytes to transmit during an allocation cycle. However, there may not be enough remaining network capacity in a current allocation cycle to transmit all of the bytes defined by the transmission profiles for each service flow that has data queued. Therefore, in some aspects, when not enough capacity remains to allocate the total number of bytes defined by the transmission profiles, the amounts to transmit may be determined proportionally to the data defined by the allocation parameters 306a-d and 308a-d.

In some aspects, block 715 may determine a remaining network capacity based on previous allocation sub-cycles. The remaining network capacity may be based on the network capacity available when process 665 began, and then the network capacity allocated by previous sub-cycles of process 665 may be subtracted from it to obtain a remaining network capacity. Furthermore, some aspects may determine what a total allocation for the current allocation cycle would be based on a summation of network capacity allocation parameters corresponding to the particular allocation cycle for the plurality of service flow types. In other words, an allocation called for by the transmission profiles may be below, equal to, or above an available or remaining network capacity. If there is less network capacity available than called for by the transmission profiles, then process 665 may need to adjust the allocations called for by the transmission profiles to fit within the available network capacity. For example, in some aspects, if there is not enough remaining network capacity to allocate based on the amounts called for by the transmission profiles, a proportional allocation of the remaining network capacity may be performed. In some aspects, the allocation is proportional to the amounts called for by the transmission profiles. In other aspects, both the amounts called for by the transmission profiles for the current sub-cycle, and the amounts called for by the transmission profiles during a previous allocation cycle may be considered when determining the amounts. For example, a difference may be determined between a service flow's allocation in a previous allocation sub-cycle, and the allocation called for in the current sub-cycle. The allocation may then be determined to be proportional to the differences.

In some other aspects, each service flow's allocation in a previous sub-cycle and its allocation called for in a current sub-cycle may be summed. The allocation for each service flow in the current sub-cycle may then be proportional to the sums.

In some aspects of block 715, after an allocation amount is determined for any one particular service flow in the current allocation sub-cycle, process 665 may determine how to partition the service flow type's allocation between a plurality of user terminals. For example, in some aspects, data for a particular service flow type may be comprised of data from a plurality of different user terminals. At least some of these user terminals may have a subscriber associated with them. In some embodiments, treatment of individual subscriber and/or the user terminals may not be equal. Some embodiments may prefer data from a first user terminal and/or subscriber over data from a second user terminal and/or subscriber.

For example, some user terminals and/or subscribers may have purchased network access plans that provide preferred access to data generated by these user terminals and/or subscribers when compared to user terminals and/or subscribers operating under other (possibly less expensive) network access plans. Alternatively, in some aspects, a subscriber's network usage relative to usage allowed under the subscriber's network access plan may be considered when determining what percentage or portion of a service flow type's allocation in a particular sub-cycle is allocated to the subscriber and/or their associated user terminal. For example, if a subscriber is over the usage provided by their network access plan, they may be allocated a smaller portion of an allocation for a service flow type than a subscriber that is within the usage limits of their respective network access plan. In some aspects, portions of some service flow types may consider subscriber usage metrics while allocation of portions of some other service flow types may not consider subscriber usage metrics. For example, some implementations may limit or eliminate allocations to user terminals over their usage limit for service flow types associated with high data usage, such as streaming service flow types. However, service flow types associated with web browsing or email may not consider a subscriber's usage when allocating portions of service flow type allocations amount user terminals.

In some aspects, allocations of a particular service flow type during a sub-cycle may be partitioned across a plurality of user terminals using a cyclic allocation process. For example, allocation parameters may be defined for each user terminal for a plurality of user terminal allocation cycles. Allocation to each user terminal during a specific user terminal allocation cycle may be based on allocation parameters associated with each user terminal that are associated with the specific allocation cycle. Several cycles may be performed until the entire allocation for the particular service flow type has been allocated to the plurality of user terminals, or all of the plurality of user terminals have allocated all of their data for the particular service flow type.

In block 720, the determined amounts for each of the plurality of service flow types are transmitted. Decision block 725 determines whether any network capacity remains for network allocation process 665. For example, in aspects that allocate one cycle of network capacity from process 600, discussed above with respect to FIG. 6, in process 665, decision block 725 determines if any network capacity in the one cycle remains. If capacity does remain, the sub-cycle is incremented in block 730, and processing returns to block 710, where process 665 repeats as described above. If no more capacity is available, process 665 may be completed.

While FIG. 7 shows the transmission of allocated amounts in block 720 for each sub-cycle of process 665, in some aspects, the transmission of allocated data may, for each service flow type, occur less than every sub-cycle. For example, in some aspects, the allocated amounts for each service flow type may be aggregated across two or more sub-cycles of process 665 and then transmitted.

In some aspects, process 665 may include at least three sub-cycles. Thus, in some aspects, the transmission profiles may be configured such that network capacity remains unallocated after two sub-cycles are complete. Thus, in these aspects, decision block 725 may determine there is remaining capacity after a second sub-cycle. Process 665 may then move to block 730, where a next ($3^{rd}$) sub-cycle is defined. Processing then repeats from block 710 for the third sub-cycle. Additional sub-cycles are contemplated. For example, 4, 5, 6, 7, 8, 9, 10, 15, 20, 25, 30, 35, 40, 45, or 50 sub-cycles may be include in process 665. The number of sub-cycles in process 665 may be based on how much network capacity is available, and also how much network capacity is allocated by allocation parameters 306*a-d* and 308*a-d* (for example) in each sub-cycle. For example, to the extent allocation parameters allocate a small percentage of available network capacity in early sub-cycles, additional sub-cycles may be perfumed by process 665.

In some aspects, a first performed allocation sub-cycle may allocate a committed information rate for each service flow type. In other words, the first allocation sub-cycle may define an amount of data that must be allocated to each service flow during process 665. In some aspects, this represents a minimum amount of data that must be allocated to each service flow type during one allocation cycle of process 600.

In some aspects, a second performed allocation sub-cycle of process 665 may allocate a middle information rate for each service flow type. A middle information rate may represent a data allocation to a particular service flow type during the second performed allocation sub-cycle that is not guaranteed.

In some aspects, a last performed allocation sub-cycle of process 665 may allocate a peak information rate for each service flow type. In some aspects, the peak information rate may only be achieved in some aspects, if the amount of total data queued for transmission is less than the available network capacity during a cycle of process 600.

In some aspects, a particular network conversation, such as a TCP connection or a UDP source Internet Protocol (IP) address/service access point (SAP) and destination IP address/SAP pair may be associated with a particular service flow based on a type of data flowing over the network conversation. For example, in some aspects, process 665 includes receiving data for transmission, and determining a transmission data type of the received data based on one or more of: a source service access point, destination service access point, and a classification of a payload of the data, and associating the received data with a service flow type based on the transmission data type. The association between the network conversation and a particular service flow may be stored to a data store, such that when a subsequent message is received for the network conversation, a new classification is not required. Instead, the data store can be consulted to quickly determine which service flow the data message should be associated with.

Some implementations may then queue the received data message(s) based on their associated service flows. For example, a queue may be maintained in some aspects for each service flow. When network capacity is allocated to a particular data flow, data of a size equivalent to the allocated capacity may be removed from the service flow queue and transmitted.

Some aspects may perform deep packet inspection in order to associate data message(s) with a service flow. For example, in some aspects, a data message may be associated with a service flow based on application level data in the data message. For example, application data may be positioned in a data message above a TCP or UDP header in the data message. In some aspects, protocol headers may be analyzed to associate a network conversation with a service flow. In some aspects, a network conversation may be classified into at least one of bursty, video file download and/or Voice Over IP. In some aspects, each of these classifications may be a separate service flow.

Figure 8:
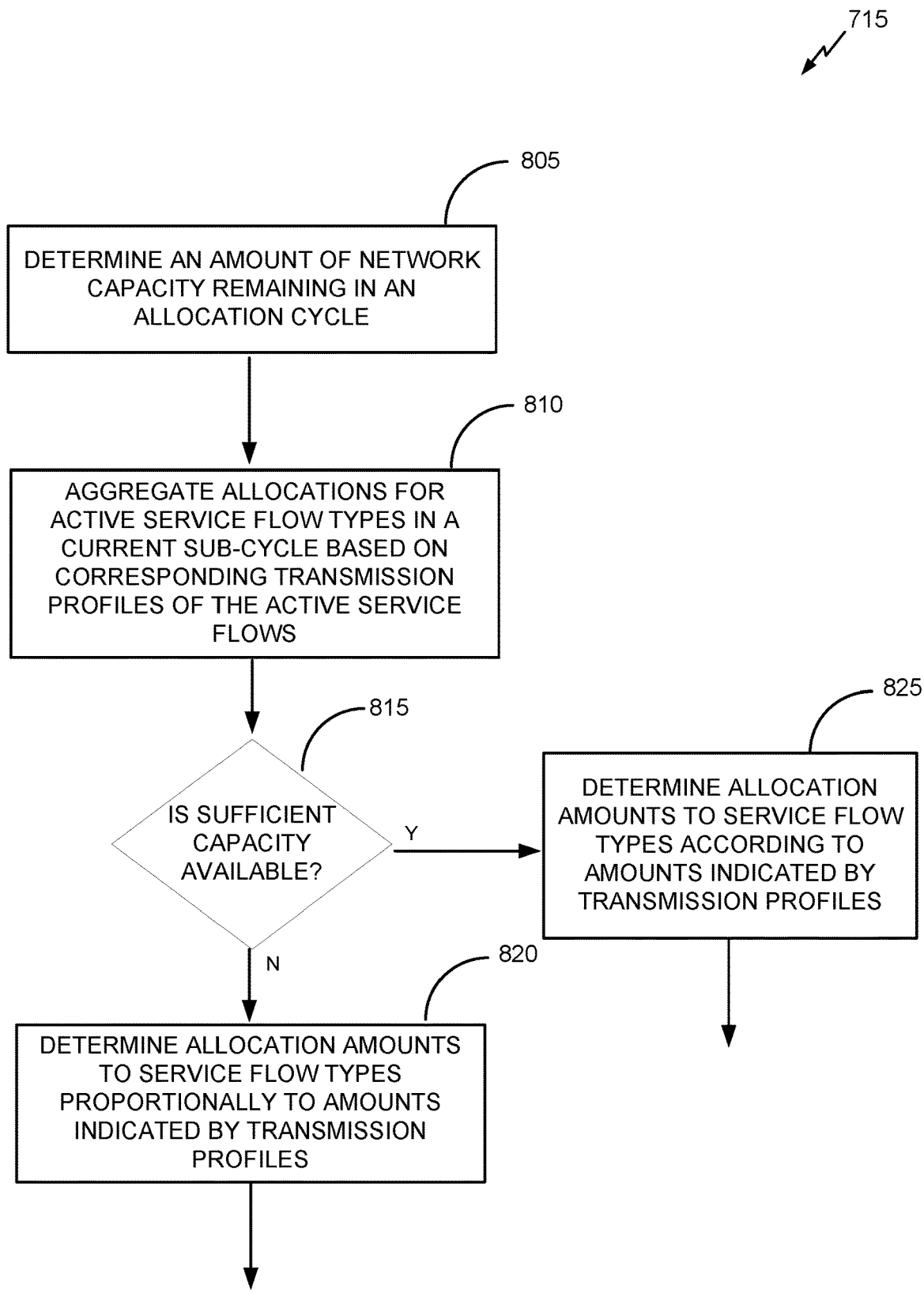
FIG. 8 is a flowchart of one embodiment of allocating network capacity during a sub-cycle of FIG. 7.

FIG. 8 is a flowchart of one embodiment of allocating network capacity during a sub-cycle 715. In some aspects, the process 715 described below with respect to FIG. 8 may be performed as part of the process 665, discussed above with respect to FIG. 7.

In some aspects, process 715 may allocate network capacity to a plurality of service flow types when an allocation amount called for or specified by transmission profiles for the plurality of service flow types indicate a greater allocation than available network capacity provides. As discussed below, in some aspects, allocations provided to a service flow in a prior allocation cycle may be considered when determining an allocation during a current allocation cycle, especially when not enough capacity is available to allocate the full amount called for by the transmission profiles to each service flow type. By considering allocations in a previous cycle In block 805, an amount of network capacity remaining in an allocation cycle is determined. For example, process 715 may be invoked multiple times during a sub-cycle of process 665. With each sub-cycle of process 665, a portion of a total network capacity for a cycle may be allocated. Thus, a remaining portion may be reduced with each invocation of process 715. Thus, block 805 determines this remaining portion in some aspects.

In block 810, allocations for a set of active service flow types for a current sub-cycle are aggregated (totaled). For example, if a current sub-cycle corresponds to sub-cycle three (3) for the transmission profiles shown in FIG. 5, and the active service flows correspond to transmission profiles 302a and 302b (i.e. there are two active service flow types in this example), then block 810 may aggregate seven (7) from 307b (corresponding to sub-cycle 3 as specified in 307a of transmission profile 302a) and six (6) from 315b (corresponding to sub-cycle 3 as specified in 315a of transmission profile 302b) for a total of thirteen (13).

Decision block 815 determines whether sufficient capacity is available for the allocations defined by the transmission profiles. If the aggregated allocation of block 810 is less than the remaining network capacity determined in block 805, then there is sufficient network capacity, and process 715 moves to block 525, where allocation amounts for a current sub-cycle are determined according to the transmission profiles. If the allocations called for by the transmission profiles exceed the available capacity, process 715 moves to block 820.

In block 820, allocations for a current sub-cycle are determined proportionally to amounts indicated by the transmission profiles. For example, in some aspects, allocations called for by transmission profiles during a previous sub-cycle and a current sub-cycle may be added for each service profile types. The allocations for the current sub-cycle may then be determined to be proportional to the sums.

In some other aspects, a difference between allocations called for by transmission profiles during a previous sub-cycle and a current sub-cycle may be determined. The allocations for the current sub-cycle may then be determined to be proportional to the differences. With this embodiment, if a first service flow type received a relatively large allocation in a previous sub-cycle, while a second service flow type received a relatively smaller allocation during the previous sub-cycle, the second service flow type may receive a proportionally larger allocation in the current sub-cycle. After the allocations for the current sub-cycle have been determined, processing continues from either block 820 or block 525. For example, when process 715 is integrated into process 665 discussed above with respect to FIG. 7, transmission of data may be performed (in block 720) in accordance with the allocations determined in block 715.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of allocating network capacity over a communication channel of a network, comprising:
    determining a transmission profile for each of a plurality of service flow types, each transmission profile defining at least three different ordered network capacity allocation cycles and defining a different network capacity allocation parameter for each network capacity allocation cycle; and
    iteratively performing, for each of the at least three ordered network capacity allocation cycles:
        selecting, for each service flow type, the network capacity allocation parameter in each service flow type's transmission profile associated with a current network capacity allocation cycle of the at least three ordered network capacity allocation cycles,
        determining amounts of data to transmit for each of the plurality of service flow types based, at least in part, on the selected network capacity allocation parameters for the current network capacity allocation cycle, and
        transmitting, over the communication channel, the determined amounts for each of the plurality of service flow types for the current network capacity allocation cycle.

2. The method of claim 1, further comprising:
    determining a total allocation for a particular allocation cycle based on a summation of network capacity allocation parameters corresponding to the particular allocation cycle for the plurality of service flow types;
    determining a remaining network capacity for the particular allocation cycle based on previous allocation cycles;
    allocating the remaining network capacity based on the network capacity allocation parameters corresponding to the particular allocation cycle and network capacity allocation parameters corresponding to a previous allocation cycle in response to the remaining network capacity being less than the total allocation for the particular allocation cycle; and
    allocating the remaining network capacity based on the network capacity allocation parameters corresponding to the particular allocation cycle in response to the remaining network capacity being greater than or equal to the total allocation for the particular allocation cycle.

3. The method of claim 2, further comprising:
    in response to the remaining network capacity being less than the total allocation for the particular allocation cycle:
        summing, for each service flow, the service flow's network capacity allocation parameters for the particular allocation cycle and network capacity allocation parameters corresponding to the previous allocation cycle; and
        allocating the remaining network capacity to each service flow in proportion to the sums for each service flow.

4. The method of claim 1, further comprising:
    receiving data for transmission;
    determining a transmission data type of the received data based on one or more of: a source service access point, a destination service access point, and a classification of a payload of the data; and associating the received data with a service flow type based on the transmission data type.

5. The method of claim 4, further comprising classifying protocol headers to determine the classification of the transmission data type.

6. The method of claim 5, further comprising classifying the transmission data type into at least one of bursty, video, file download, and VoIP.

7. The method of claim 1, further comprising:
allocating network capacity during a first time period based on the set of network capacity allocation cycles; and
allocating network capacity during a non-overlapping second time period based on a second set of network capacity allocation cycles.

8. The method of claim 1, further comprising:
iteratively performing, for each of the at least three ordered network capacity allocation cycles: allocating the determined amounts of data to transmit for each of the plurality of service flow types to a plurality of user terminals based on allocation parameters associated with each of the plurality of user terminals.

9. The method of claim 8, further comprising:
determining a user terminal profile for each of the plurality of user terminals, each user terminal profile defining at least three different allocation parameters for user terminal data associated with a service flow type, the at least three different allocation parameters associated with at least three different ordered network capacity allocation cycles respectively; and
iteratively performing, for each of the at least three ordered network capacity allocation cycles: allocating a portion of a determined amount for a service flow type to a user terminal based at least in part on the allocation parameter defined by the determined user terminal profile for the user terminal corresponding to the current network capacity allocation cycle,
wherein the transmitting of the determined amounts for each of the plurality of service flow types for the current network capacity allocation cycle comprises transmitting the allocated portion for the user terminal.

10. An apparatus for allocating network capacity over a communication channel of a network, comprising:
an electronic hardware processor; and
an electronic hardware memory, operably coupled to the electronic hardware processor, and storing instructions that when executed cause the electronic hardware processor to perform a method of allocating network capacity over a communication channel of a network, the method comprising:
determining a transmission profile for each of a plurality of service flow types, each transmission profile defining at least three different ordered network capacity allocation cycles and defining a different network capacity allocation parameter for each network capacity allocation cycle; and
iteratively performing, for each of the at least three ordered network capacity allocation cycles:
selecting, for each service flow type, the network capacity allocation parameter in each service flow type's transmission profile associated with a current network capacity allocation cycle of the at least three ordered network capacity allocation cycles,
determining amounts of data to transmit for each of the plurality of service flow types based, at least in part, on the selected network capacity allocation parameters for the current network capacity allocation cycle, and
transmitting over the communication channel, the determined amounts for each of the plurality of service flow types for the current network capacity allocation cycle.

11. The apparatus of claim 10, wherein the electronic hardware memory stores further instructions that when executed cause the electronic hardware processor to:
determine a total allocation for a particular allocation cycle based on a summation of network capacity allocation parameters corresponding to the particular allocation cycle for the plurality of service flow types,
determine a remaining network capacity for the particular allocation cycle based on previous allocation cycles,
allocate the remaining network capacity based on the network capacity allocation parameters corresponding to the particular allocation cycle and network capacity allocation parameters corresponding to a previous allocation cycle in response to the remaining network capacity being less than the total allocation for the particular allocation cycle, and
allocate the remaining network capacity based on the network capacity allocation parameters corresponding to the particular allocation cycle in response to the remaining network capacity being greater than or equal to the total allocation for the particular allocation cycle.

12. The apparatus of claim 11, wherein the electronic hardware memory stores further instructions that when executed cause the electronic hardware processor to:
in response to the remaining network capacity being less than the total allocation for the particular allocation cycle:
summing, for each service flow, the service flow's network capacity allocation parameters for the particular allocation cycle and network capacity allocation parameters corresponding to the previous allocation cycle; and
allocating the remaining network capacity to each service flow in proportion to the sums for each service flow.

13. The apparatus of claim 10, wherein the electronic hardware memory stores further instructions that when executed cause the electronic hardware processor to:
receive data for transmission;
determine a transmission data type of the received data based on one or more of: a source service access point, a destination service access point, and a classification of a payload of the data; and
associate the received data with a service flow type based on the transmission data type.

14. The apparatus of claim 13, wherein the electronic hardware memory stores further instructions that when executed cause the electronic hardware processor to classify protocol headers to determine the classification of the transmission data type.

15. The apparatus of claim 14, wherein the electronic hardware memory stores further instructions that when executed cause the electronic hardware processor to classify the transmission data type into at least one of bursty, video, file download, and VoIP.

16. The apparatus of claim 10, wherein the electronic hardware memory stores further instructions that when executed cause the electronic hardware processor to:
allocate network capacity during a first time period based on the set of network capacity allocation cycles; and allocate network capacity during a non-overlapping second time period based on a second set of network capacity allocation cycles.

17. The apparatus of claim 10, wherein the electronic hardware memory stores further instructions that when executed cause the electronic hardware processor to:
for each of the at least three ordered network capacity allocation cycles: allocate the determined amounts of data to transmit for each of the plurality of service flow types to a plurality of user terminals based on allocation parameters associated with each of the plurality of user terminals.

18. The apparatus of claim 17, wherein the electronic hardware memory stores further instructions that when executed cause the electronic hardware processor to:
determine a user terminal profile for each of the plurality of user terminals, each user terminal profile defining at least three different allocation parameters for user terminal data associated with a service flow type, the at least three different allocation parameters associated with at least three different ordered network capacity allocation cycles respectively; and
iteratively perform, for each of the at least three ordered network capacity allocation cycles: allocate a portion of a determined amount for a service flow type to a user terminal based at least in part on the allocation parameter defined by the determined user terminal profile for the user terminal corresponding to the current network capacity allocation cycle,
wherein the transmitting of the determined amounts for each of the plurality of service flow types for the current network capacity allocation cycle comprises transmitting the allocated portion for the user terminal.

19. An apparatus for allocating network capacity over a communication channel of a network, comprising:
means for allocating different proportions of available network capacity to a plurality of service flow types during each of at least three ordered network capacity allocation cycles, the means configured to determine a transmission profile for each of the plurality of service flow types, each transmission profile defining at least three different network capacity allocation parameters for the at least three different ordered network capacity allocation cycles, and allocate the different proportions in accordance with the determined transmission profiles; and
means for transmitting data comprising the plurality of service flow types according to the allocations,
wherein, for each of the at least three ordered network capacity allocation cycles:
the means for allocating different proportions of available network capacity selects, for each service flow type, the network capacity allocation parameter in each service flow type's transmission profile associated with a current network capacity allocation cycle of the at least three ordered network capacity allocation cycles,
the means for allocating different proportions of available network capacity determines amounts of data to transmit for each of the plurality of service flow types based, at least in part, on the selected network capacity allocation parameters for the current network capacity allocation cycle, and
the means for transmitting data transmits over the communication channel, the determined amounts for each of the plurality of service flow types for the current network capacity allocation cycle.

20. The apparatus of claim 19, wherein the means for allocating different proportions of available network capacity is further configured to:
determine a total allocation for a particular allocation cycle based on a summation of network capacity allocation parameters corresponding to the particular allocation cycle for the plurality of service flow types,
determine a remaining network capacity for the particular allocation cycle based on previous allocation cycles,
allocate the remaining network capacity based on the network capacity allocation parameters corresponding to the particular allocation cycle and network capacity allocation parameters corresponding to a previous allocation cycle in response to the remaining network capacity being less than the total allocation for the particular allocation cycle, and
allocate the remaining network capacity based on the network capacity allocation parameters corresponding to the particular allocation cycle in response to the remaining network capacity being greater than or equal to the total allocation for the particular allocation cycle.

21. The apparatus of claim 20, wherein the means for allocating different proportions of available network capacity is further configured to in response to the remaining network capacity being less than the total allocation for the particular allocation cycle:
sum each service flow's network capacity allocation parameters for the particular allocation cycle and network capacity allocation parameters corresponding to the previous allocation cycle, and
allocate the remaining network capacity to each service flow in proportion to the sums for each service flow.

22. The apparatus of claim 19, wherein the means for allocating different proportions of available network capacity is further configured to
receive data for transmission,
determine a transmission data type of the received data based on one or more of: a source service access point, a destination service access point, and a classification of a payload of the data, and
associate the received data with a service flow type based on the transmission data type.

23. The apparatus of claim 22, wherein the means for allocating different proportions of available network capacity is further configured to classify protocol headers to determine the transmission data type.

24. The apparatus of claim 23, wherein the means for allocating different proportions of available network capacity is further configured to classify the transmission data type into at least one of bursty, video, file download, and VoIP.

25. The apparatus of claim 19, wherein the means for allocating different proportions of available network capacity is further configured to:
allocate different proportions of available network capacity during a first time period based on the at least three network capacity allocation cycles; and
allocate network capacity during a non-overlapping second time period based on a second set of at least three network capacity allocation cycles.

26. A non-transitory computer readable medium comprising instructions that when executed cause a processor to perform a method of allocating network capacity over a communication channel of a network, the method comprising:
determining a transmission profile for each of a plurality of service flow types, each transmission profile defining at least three different ordered network capacity allocation cycles and defining a different network capacity allocation parameter for each network capacity allocation cycle; and iteratively performing, for each of the at least three ordered network capacity allocation cycles:
- selecting, for each service flow type, the network capacity allocation parameter in each service flow type's transmission profile associated with a current network capacity allocation cycle of the at least three ordered network capacity allocation cycles,
- determining amounts of data to transmit for each of the plurality of service flow types based, at least in part, on the selected network capacity allocation parameters for the current network capacity allocation cycle, and
- transmitting over the communication channel, the determined amounts for each of the plurality of service flow types for the current network capacity allocation cycle.

27. The non-transitory computer readable medium of claim 26, wherein the method of allocating network capacity further comprises:
- determining a total allocation for a particular allocation cycle based on a summation of network capacity allocation parameters corresponding to the particular allocation cycle for the plurality of service flow types;
- determining a remaining network capacity for the particular allocation cycle based on previous allocation cycles;
- allocating the remaining network capacity based on the network capacity allocation parameters corresponding to the particular allocation cycle and network capacity allocation parameters corresponding to a previous allocation cycle in response to the remaining network capacity being less than the total allocation for the particular allocation cycle; and
- allocating the remaining network capacity based on the network capacity allocation parameters corresponding to the particular allocation cycle in response to the remaining network capacity being greater than or equal to the total allocation for the particular allocation cycle.

28. The apparatus of claim 19, wherein the means for allocating different proportions of available network capacity is further configured to, for each of the at least three ordered network capacity allocation cycles, allocate the determined amounts of data to transmit for each of the plurality of service flow types to a plurality of user terminals based on allocation parameters associated with each of the plurality of user terminals.

29. The apparatus of claim 19, wherein the means for allocating different proportions of available network capacity is further configured to:
- determine a user terminal profile for each of the plurality of user terminals, each user terminal profile defining at least three different allocation parameters for user terminal data associated with a service flow type, the at least three different allocation parameters associated with at least three different ordered network capacity allocation cycles respectively; and
- iteratively perform, for each of the at least three ordered network capacity allocation cycles: allocate a portion of a determined amount for a service flow type to a user terminal based at least in part on the allocation parameter defined by the determined user terminal profile for the user terminal corresponding to the current network capacity allocation cycle,
- wherein the transmitting of the determined amounts for each of the plurality of service flow types for the current network capacity allocation cycle comprises transmitting the allocated portion for the user terminal.

* * * * *